J. ATKINS.
Harvester.
No. 1,633.
Reissued March 8, 1864.
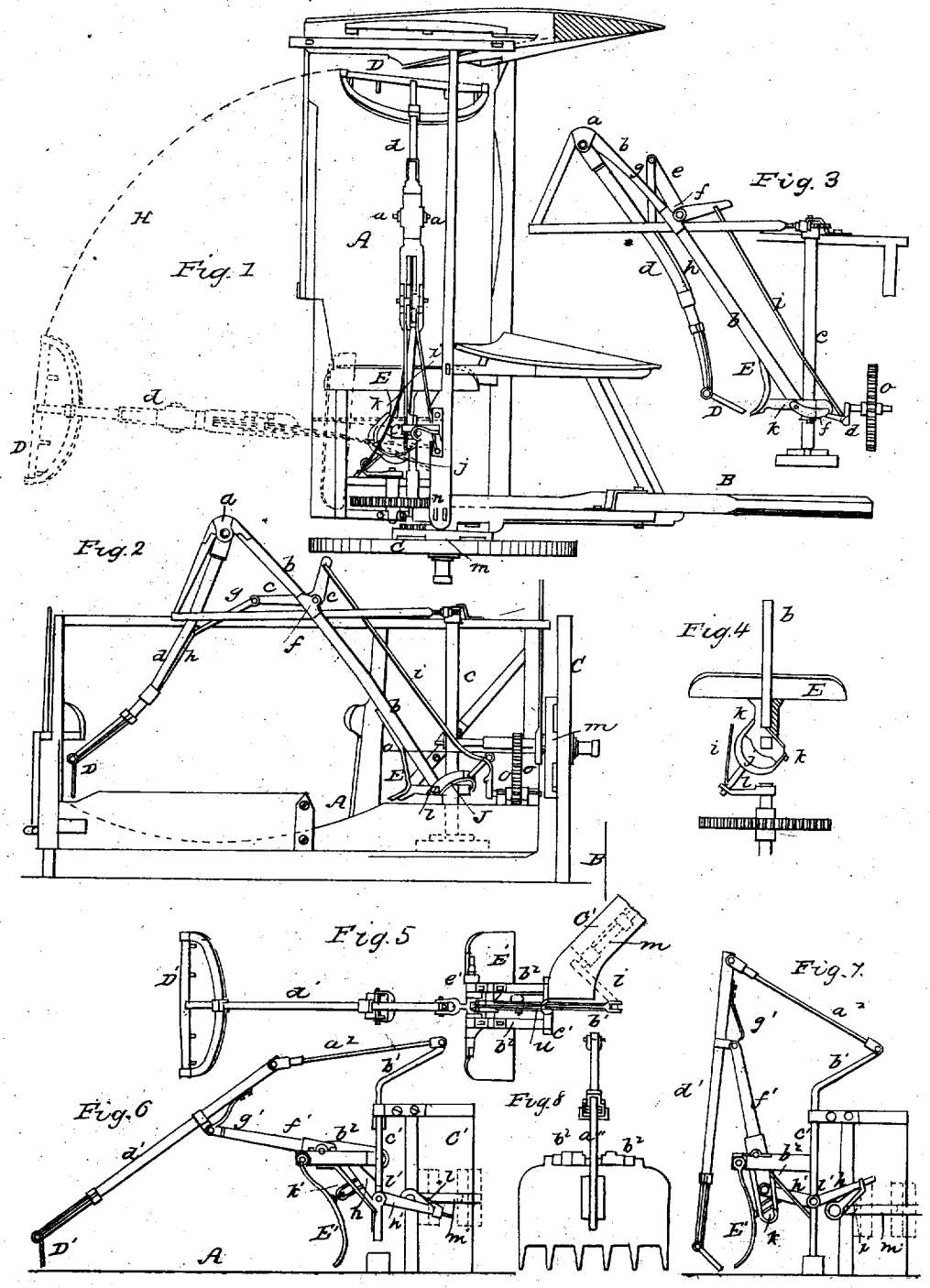
N. PETERS, Photo-Lithographer, Washington, D. C.

UNITED STATES PATENT OFFICE.

WALTER WRIGHT, OF CHICAGO, ILLINOIS, ASSIGNEE, BY MESNE ASSIGNMENTS, OF JEARUM ATKINS.

IMPROVEMENT IN RAKES TO GRAIN-HARVESTERS.

Specification forming part of Letters Patent No. 9,479, dated December 21, 1852; Reissue No. 282, dated October 31, 1854; Reissue No. 1,633, dated March 8, 1864.

*To all whom it may concern:*

Be it known that JEARUM ATKINS, of Chelsea, in the county of Will and State of Illinois, the assignor to JOHN S. WRIGHT, who is assignor to JAMES CLAPP, the assignor to WALTER WRIGHT, has invented a certain new and useful Improvement in Rakes for Harvesting-Machines; and I, the said WALTER WRIGHT, do hereby declare the following to be a full, clear, and exact description of the same, which will be better understood by reference to the accompanying drawings, which form part of this specification.

The object of this invention is to provide a rake which by its automatic movement shall rake the grain from the platform as it is cut and deliver it upon the inner side of the swath in gavels, ready to be bound. By the "inner side," as used in this specification, I mean that side of the swath or of the machine which is farthest from the uncut grain.

Another object is to deposit the gavel in such a way that the straw shall be left lying nearly at right angles with the track of the machine, by which means the binding of the grain will be greatly facilitated.

I am aware that contrivances have been invented by which both these objects have been accomplished, but never, as I believe, with the sweep which is desirable, owing, mainly, to the fact either that two rakes were necessarily employed for that purpose, or that some part of the machinery by which the rake has been operated has been so placed as to become entangled with the standing grain, or with that which was lying cut upon the platform. These difficulties have been successfully overcome by the invention now under consideration.

To effect this object, a rake is used which is supported, guided, and impelled by contrivances all placed upon the inner side of the machine, and out of the way of the grain which is cut or uncut. By this means all entanglement of the grain with the machinery is successfully avoided.

To enable any person skilled in the art to make and use this invention, I will now proceed to describe the construction and operation of the contrivances which I prefer for this purpose, observing, however, that these may be greatly changed without departing from the principle of the invention.

In the accompanying drawings, Figure 1 is a plan of a harvesting-machine in part, with the rake and mechanical devices for operating it attached, the rake being represented in black lines as collecting the grain on the platform and in red lines as delivering the gavel on the inner side of the machine. Fig. 2 is an elevation, viewed from the rear, showing the rake and its parts as represented in black lines in Fig. 1. Fig. 3 is a similar view, showing, mainly, the rake and its immediate appurtenances only, the rake being represented as in the act of compressing the grain into a gavel, previous to swinging to the position shown in red lines, Fig. 1, for delivery in the rear. Fig. 4 is a detached plan, taken through the line *o o*, Fig. 2, of the swivel, chiefly showing its attachment to the crane and operating-crank. Figs. 5, 6, 7, and 8 are views showing a modification of the rake or different means employed for operating it, Fig. 5 being a plan of the rake occupying the same position as that in Fig. 1 in black lines. Fig. 6 is an elevation from the rear, (similar to Fig. 2,) exhibiting the modified rake as commencing to collect the grain on the platform; Fig. 7, a like view, but showing the same rake in the act of compressing the grain, as illustrated in Fig. 3, for the rake first referred to. Fig. 8 is an elevation at right angles to Fig. 6, showing the modified rake and its hand as opening for delivery of the gavel that is in the position represented by red lines in Fig. 1.

The first part of the following description has reference to the rake and its appurtenances, as exhibited in Figs. 1, 2, 3, and 4.

A is the platform of an ordinary harvesting-machine. Its upper surface is of a concave form, to correspond with the motion of the rake across it. B is the tongue or draft-bar to which the horses are attached, and C is the driving-wheel which gives motion to the cutter and to the rake.

The rake by its handle *d* is suspended at the joint *a* to the jib *b* of a crane, of which *c* is the post, that swings or turns at the proper interval, working in bearings above and below in the frame of the machine near the line of draft. Near the foot of the gib *b* and attached to it is a palm or hand, E, which is a board or plate of suitable length and breadth, extending across the inner end of the platform when the rake is situated as shown in black lines. A bell-crank, *e*, has its bearing *f* in the gib, and is connected at its one arm by a rod, *g*, to the rake-handle through a spring, *h*. This spring performs the same office as if the rake-handle were slightly flexible, and allows yielding when compressing the grain into a gavel. This same yielding may be provided for by means of a spring connected with the palm E. The other arm of the bell-crank *e* is attached by a rod, *i*, to a swivel, *j*, which is hung at one end on pivots *k k*, Fig. 4, to a cross-brace of the post *c*, and connected at its other extremity to a crank, *l*, to which (when the said crank lies horizontal) the swivel as hung to the post *c* is situated at an angle of about forty-five degrees. The crank *l* revolves, and derives its motion through the driving-wheel C by means of a ring, *m*, applied to said driving-wheel, and having teeth on its inner circumference which mesh into a pinion on the same shaft as the pinion *n*, which gears into a wheel, *o*, on the shaft or spindle of the crank *l*.

The rake thus attached and operated will, in starting from the off side of the machine nearest the standing grain, describe a sweep from the point *a* across the platform directly toward the line of draft, the crane motion of the rake being dormant during such travel, by reason of the relative situation of the swivel *j* to the crank *l*, which latter at this period of the rake's motion merely gives a vibratory movement to the swivel *j*, so as to operate the bell-crank *e* that draws in or closes the rake, thereby gathering and compressing the grain into a gavel, which is tightly held by the rake and hand E, some little play being allowed in the several parts to prevent the crank *l*, when the rake is performing its collecting part of the travel, from giving the crane motion to the rake—that is, turning the post *c*; but when the grain is thus held, collected, and pressed, the crank *l*, by its continued movement, and while passing its lowest point of travel, operates, by the angle it proceeds to describe with the swivel upon the post *c*, to turn it for about the quarter of a circle. The rake and hand, thus swinging, carry the collected grain in between them, such being the exclusive action of the crank as regards its effect upon the rake until the post is so turned and the jib so situated in rear of the machine as is represented by red lines in Fig. 1. The crank *l* then continuing to revolve, the bell-crank *e* is again acted upon so as to throw out the rake from the palm E and deliver the gavel on the ground in rear of the machine. This being done, the crank *l* by its continued motion (and while passing its highest point of travel) swings back the rake to the outer side of the platform for a repetition of the action described. The crank *l*, by its swivel-connection, as shown and specified, thus for two alternate quarters of the circle it describes, operates exclusively the bell-crank *j*, and alternately for the other two quarters of its circle gives exclusively the crane motion—that is, simply turns the post *c*, composing for the combined travels of the rake the figure represented by the dotted lines H in Fig. 1.

Figs. 5, 6, 7, and 8 of the drawings refer to a modification of the before-described improvement, and exhibit a rake which, as regards its travel or motion, is mainly similar to that above described, excepting that the palm has at proper intervals a slight vibratory movement communicated to it independently of its motion with the crane-post. In the above figures the rake and its gear, as connected with the platform of the harvesting-machine exclusively, is shown, A′ being the platform. Its upper surface is shown straight, but may be of slightly-convex form to correspond with the travel across the rake. B′ is a line indicating the direction and situation of the tongue or draft-bar. C′ is a vertical frame or post erected on the platform. D′ is the rake. Its handle *d′* is jointed at its upper extremity by a rod, $a^2$, to a jib, *b′*, of a crane, of which *c′* is the post. E′ is the palm or hand. It is provided with teeth at its lower edge, and is suspended to a second jib, $b^2$, attached to the crane-post. It has an inclination given to it to press outward from the post by means of a spring, *e′*. *f′* is a swinging beam, hung by trunnions on the jib $b^2$, and jointed at its outer extremity to the rake-handle *d′*, with which it connects at a suitable distance from the top. A spring, *g′*, is attached to the rake-handle. It presses on the swinging beam *f′* when the rake is being thrown out to its greatest stretch, and serves to start the handle *d′* from the straight line which the rod $a^2$ forms with it when the rake is fully extended. The inner end of the swinging beam *f′* is made with a slot in it, in which works a roller running on a wrist of one arm of a crank-lever, *h′*, that is fast to a horizontal spindle or shaft, *i′*, having its bearings in the crank-post. The other arm of the crank-lever *h′*, forming an obtuse angle with the first arm, has a round extremity fitting loosely into a bent lip of a revolving crank, *l′*, whose shaft *m′*, turning in the post *c′*, lies at an angle of about forty-five degrees to a center line intersecting the crane and rake when situated as in Fig. 6, or at about the same angle to the line of draft B′. A link, *k′*, is hooked to the back of the palm E′ and to a stud projecting midway, or thereabout, from the side of the lever *h′*. Motion is communicated to the shaft *m′* by any suitable gearing from the driving-wheel. The crank *l′* in revolving produces a similar motion upon the rake as in that described in Figs. 1, 2, 3, and 4, excepting that the rake travels nearly in a straight line across the platform, and, as before observed, the palm has a slight movement given it at intervals.

The operations of the several mechanical devices described in Figs. 5, 6, 7, and 8 for working this latter modified rake are so similar to those already described as to need no special description.

It will be seen that the motion given to the rake is the quickest and most powerful at those points where such differences will produce the best effects. The rake has the greatest leverage-power exerted upon it when compressing the grain against the palm. Different velocities may be communicated to the operating-crank *l* or *l'* by suitable gearing, so as to accommedate the action of the rake (in forming a gavel) with respect to the forward movement of the machine, so as to be adapted to the raking of the grain when light or heavy, or so as to increase or diminish the size of the gavels.

The delivery of the gavels in the rear instead of at the side, as is common in machines now in general use, has several advantages—the grain is less likely to be scattered by the forward movement of the machine, and it is dropped in a more compact form.

The turning of the gavel so that the straw shall lie perpendicularly across the line of draft greatly facilitates the binding of the same, as the binder walks directly up to the gavel to be bound, instead of being obliged to go around upon its side.

Having thus described one mode of giving effect to this invention, I wish it to be understood that I do not intend to limit myself to the precise contrivances or combinations of parts herein described, though I consider the method above set forth as preferable to any that have suggested themselves to my mind for that purpose.

What I claim as new, and desire to secure Letters Patent, is—

1. An automatic rake for harvesters, which shall singly and alone rake and deposit the gavel with the straw nearly at right angles to the line of draft, when such rake is controlled in its movements by contrivances no part of which shall be placed upon the outer side of the machine, substantially as described.

2. An automatic rake for harvesters, which shall singly and alone rake and deposit the gavel with the straw nearly at right angles with the line of draft, when such rake is sustained, guided, and impelled by contrivances so placed on the inner side of the machine as not to be liable to become entangled either with the cut or with the uncut grain, substantially as described.

3. An automatic rake for harvesters, which singly and alone shall rake and deposit the gavel so far on the inner side of the newly-cut swath as to be out of the way of the horses on the next round, and then swing back to its proper position for raking a new gavel in lines which shall both in plan and elevation be substantially different from those described by its various parts in making its forward movement, thus keeping clear of the standing grain, as well as that which lies upon the platform, when the movements of said rake are accurately directed without the use of any exterior guide, or other fixture for that purpose, substantially as described.

4. In an automatic rake for harvesters, the employment of a palm or its equivalent, by which, in connection with the said rake, the gavel may be firmly grasped, when said arrangement is so contrived as to provide for a yielding pressure between the rake and the palm, so as to be accommodated to the size of the gavel, substantially as described.

5. In a harvester, the use of an automatic rake which shall rake the gavel to the inner side of the machine, when, in combination with a palm or its equivalent, it shall grasp and turn and deposit it so that the straw shall lie perpendicularly to the line of draft, or nearly so, substantially as described.

6. In a harvester, the use of an automatic rake, which, by a rapid movement in a direction nearly parallel with the cutter-bar, shall rake the gavel, and then, by a slower movement, shall return outward and back to its proper position for commencing a new gavel, so as not to interfere with the cut or with the uncut grain, when all the contrivances for giving such motion shall stand upon the inner side of the machine, substantially as described.

7. In a harvesting-machine, a turning shaft or crane-post the axis of which constantly preserves the same angle with the platform, in combination with a rake which has an undulating or swinging motion communicated to it through its arm or handle to bring it back after raking one gavel to its proper position for commencing another by means of an oscillating or rotary motion of said turning shaft upon its axis, substantially as described.

WALTER WRIGHT.

Witnesses:
E. W. RUSSEL,
F. S. HOWE.